(12) United States Patent
Tomczyk et al.

(10) Patent No.: US 9,339,146 B2
(45) Date of Patent: May 17, 2016

(54) UNIVERSAL FOOD HOLDING CABINET WITH BUTTONED-IN ESCUTCHEONS

(75) Inventors: Wieslaw Tomczyk, Wheeling, IL (US); Terry Tae-Il Chung, New Fairfield, CT (US); Jeff Schroeder, Lake Zurich, IL (US); Brian Mathews, Waterman, IL (US); Thomas A. Marchese, Schaumburg, IL (US)

(73) Assignee: PRINCE CASTLE LLC, Carol Stream, IL (US)

(*) Notice: Subject to any disclaimer, the term of this patent is extended or adjusted under 35 U.S.C. 154(b) by 1097 days.

(21) Appl. No.: 13/086,945

(22) Filed: Apr. 14, 2011

(65) Prior Publication Data

US 2012/0261426 A1    Oct. 18, 2012

(51) Int. Cl.
| | |
|---|---|
| F21S 4/00 | (2006.01) |
| A47J 39/02 | (2006.01) |
| A47B 95/04 | (2006.01) |
| A47J 39/00 | (2006.01) |

(52) U.S. Cl.
CPC ............. *A47J 39/02* (2013.01); *A47B 95/04* (2013.01); *A47J 39/006* (2013.01)

(58) Field of Classification Search
CPC ....... A47J 39/006; B65D 81/18; A47B 95/04; A47B 95/043; A47B 57/50; F21S 4/00; E05B 3/06
USPC ...................................... 220/592.01; 219/201
See application file for complete search history.

(56) References Cited

U.S. PATENT DOCUMENTS

| | | | | |
|---|---|---|---|---|
| 3,626,487 | A * | 12/1971 | Seiz | 211/192 |
| 4,113,110 | A * | 9/1978 | Mittag | 211/191 |
| 4,984,138 | A * | 1/1991 | Graham | 362/85 |
| 5,428,912 | A | 7/1995 | Grondal et al. | |
| 5,542,201 | A | 8/1996 | Grondal et al. | |
| 5,741,058 | A | 4/1998 | Suzuki et al. | |
| 5,752,356 | A * | 5/1998 | Miklavic et al. | 52/718.02 |
| 5,797,445 | A * | 8/1998 | Westbrooks et al. | 165/11.1 |
| 6,026,602 | A | 2/2000 | Grondal et al. | |
| 6,244,728 | B1 | 6/2001 | Cote et al. | |
| 6,658,994 | B1 * | 12/2003 | McMillan | 99/468 |
| 6,920,990 | B2 * | 7/2005 | Krueger et al. | 211/183 |
| 7,227,102 | B2 * | 6/2007 | Shei | 219/394 |
| 7,262,438 | B2 | 8/2007 | Mok et al. | |
| 7,287,896 | B2 | 10/2007 | Okamoto et al. | |
| 7,971,523 | B2 * | 7/2011 | Hartfelder et al. | 99/448 |

(Continued)

FOREIGN PATENT DOCUMENTS

| | | |
|---|---|---|
| EP | 0920039 | 6/1999 |
| EP | 1161754 | 12/2001 |

(Continued)

OTHER PUBLICATIONS

"Halo Illumination" Pushbuttons advertisement, EAO Switch Corp.

*Primary Examiner* — Stephen F Husar
(74) *Attorney, Agent, or Firm* — Marshall, Gerstein & Borun LLP (57) ABSTRACT

Escutcheons for a temperature-controlled food holding cabinet are removable and field replaceable by the use of interlocking keys and keyholes that hold the escutcheon in place and align the escutcheon to electrical connectors. The escutcheons are provided with illuminated user interfaces. A key formed on either the escutcheon or chassis of the cabinet, engages a corresponding keyhole formed on either the cabinet chassis or the escutcheon.

18 Claims, 8 Drawing Sheets

(56) References Cited

U.S. PATENT DOCUMENTS

| | | | |
|---|---|---|---|
| 8,499,683 B2* | 8/2013 | Shei | 99/329 P |
| 8,714,372 B2* | 5/2014 | Yogev | 211/71.01 |
| 2004/0004827 A1 | 1/2004 | Guest | |
| 2005/0270794 A1 | 12/2005 | Okamoto et al. | |
| 2006/0139907 A1* | 6/2006 | Yen | 362/85 |
| 2006/0202210 A1 | 9/2006 | Mok et al. | |
| 2007/0283604 A1 | 12/2007 | Kaoh | |
| 2008/0024067 A1 | 1/2008 | Ishibashi | |
| 2008/0164934 A1 | 7/2008 | Hankey et al. | |
| 2008/0166006 A1 | 7/2008 | Hankey et al. | |
| 2011/0114618 A1* | 5/2011 | Chung | A47J 39/006 219/201 |

FOREIGN PATENT DOCUMENTS

| | | |
|---|---|---|
| EP | 1237782 | 9/2002 |
| GB | 2276713 | 10/1994 |
| GB | 2303830 | 3/1997 |
| GB | 2311973 | 10/1997 |
| GB | 2424124 | 9/2006 |
| WO | 085862 | 7/2008 |

* cited by examiner

UNIVERSAL FOOD HOLDING CABINET WITH BUTTONED-IN ESCUTCHEONS

BACKGROUND

Many restaurants' success depends on how quickly customers can be served with food items that a customer orders. If the rate at which a restaurant cooks food products equals the rate at which those same food products are being ordered and sold, a fast food restaurant can theoretically have freshly-cooked foods ready to serve for customers as they arrive. Since it is not always possible to match cooked-food production with customer ordering rates, and since fast food restaurant customers expect to receive their ordered food items quickly, many fast food restaurants pre-cook various food items and keep them warm, ready for sale until a customer arrives and purchases a pre-cooked food item.

Pre-cooked food items cannot be stored for prolonged periods and should be kept warm while they are being held. Prolonged heating causes food texture and flavor to deteriorate. The time that a food product can be kept warm yet remain palatable will vary with each type of food product. It is therefore beneficial to have an ability to store different types of foods at different temperatures and keep track of the time that a food has been kept warm.

Food holding cabinets are well known in the prior art. A problem with prior art food holding cabinets, as with most commercial restaurant equipment is that they sometimes fail and require a service technician to repair. In keeping with food service operators' goal of reducing cost, it would be desirable to provide on-site serviceability to a food holding cabinet whereby repairs can be effectuated by a restaurant operator, on-site and without having to call a service technician.

BRIEF DESCRIPTIONS OF THE DRAWINGS

Preferred embodiments are set forth in the following detailed description and accompanying in drawings in which like reference numerals represent like parts.

DETAILED DESCRIPTION

Figure 1:
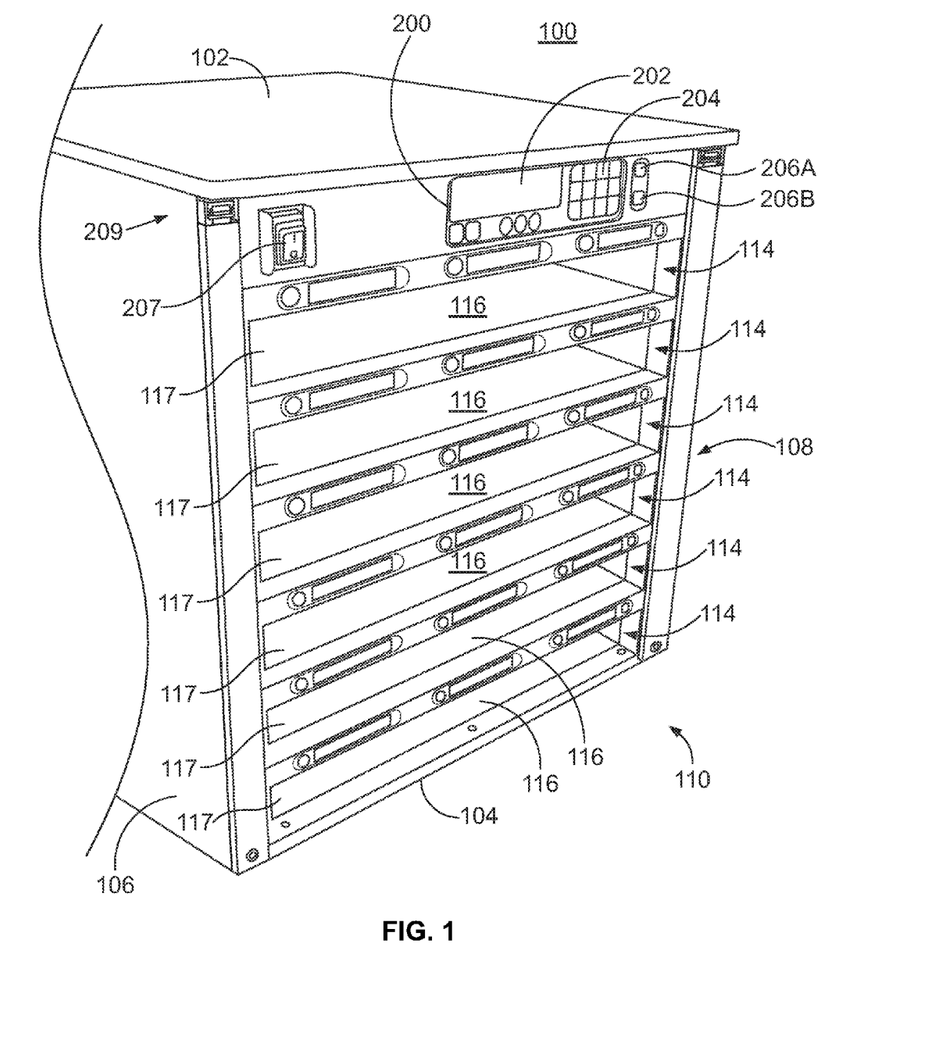
FIG. 1 is a perspective view of a temperature controlled food holding cabinet with buttoned-in escutcheons.

FIG. 1 is a perspective view of a temperature controlled food holding cabinet 100. The cabinet 100 is comprised of a top panel 102, a bottom panel 104, a left side panel 106 and a right side panel 108. The cabinet 100 also has a front side 110 and a rear side not visible in FIG. 1.

The top 102, bottom 104, left side 106 and the right side 108 comprise the chassis of the cabinet 100. "Chassis" and "cabinet" are used interchangeably.

The front side 100 (and rear side as well) has several substantially rectangular openings 114 into corresponding temperature-controlled food holding compartments 116. Food items, not shown, can be placed into the compartments 116 through the openings 114. Once a food item is placed inside the compartment 116, the temperature of a food item therein can be maintained relatively constant.

Figure 2:
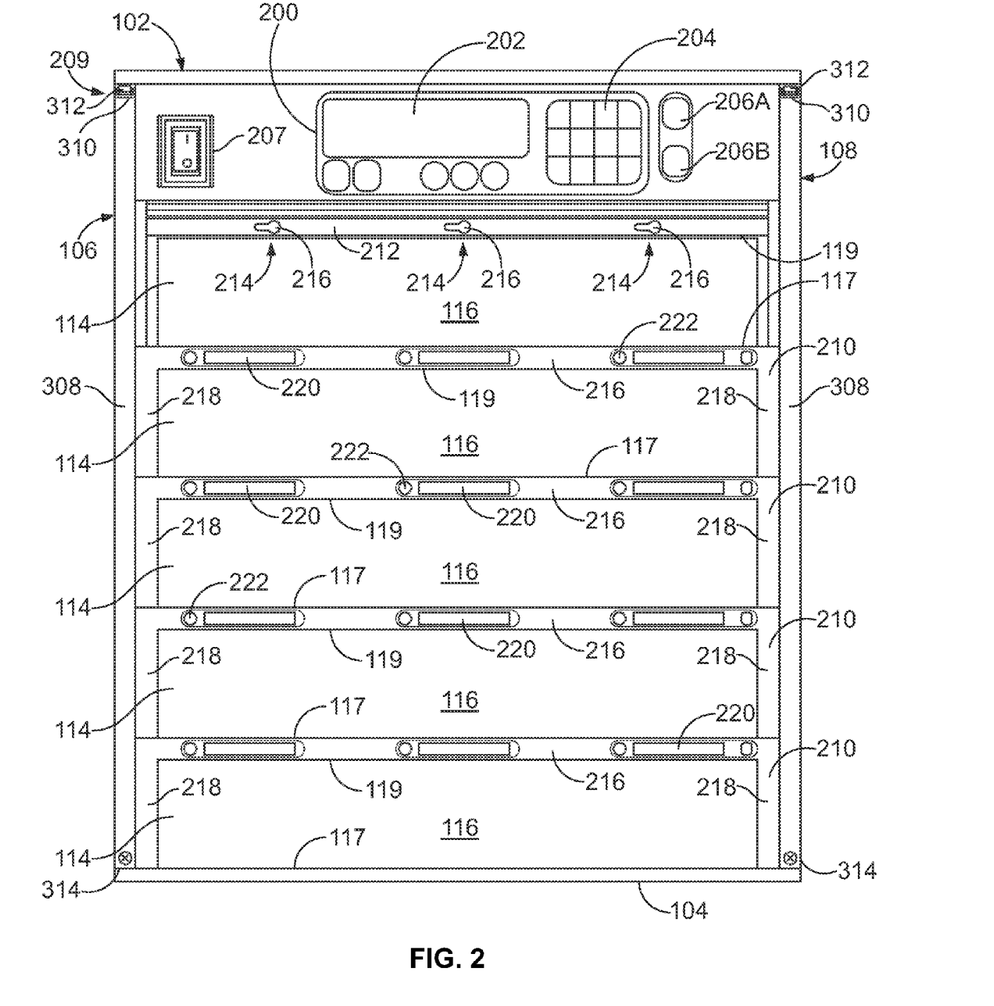
FIG. 2 is a front elevation of the temperature controlled food holding cabinet shown in FIG. 1.

FIG. 2 is a front elevation view of the food holding cabinet 100. A control panel 200 provides a user interface. The control panel 200 includes a display panel 202 on which messages and status information is displayed. The display panel 202 is typically embodied as a liquid crystal display (LCD) panel, a light emitting diode (LED) panel or a plasma display panel.

A key pad 204 with pushbuttons and switches 206A and 206B enable a user to make various operational changes, such as specifying one or more temperatures for the different compartments 116. An on/off switch 207 located in the upper left hand corner 209 of the cabinet 100 enables the cabinet 100 to be turned on and off.

Each opening 114 into a heated compartment 116 is bounded on three sides by a buttoned-in escutcheon 210, the shape of which is reminiscent of an inverted Arabic letter "U." In FIG. 2, the escutcheon 210 for the top or upper-most compartment 116 is shown as having been removed.

Figure 5A:
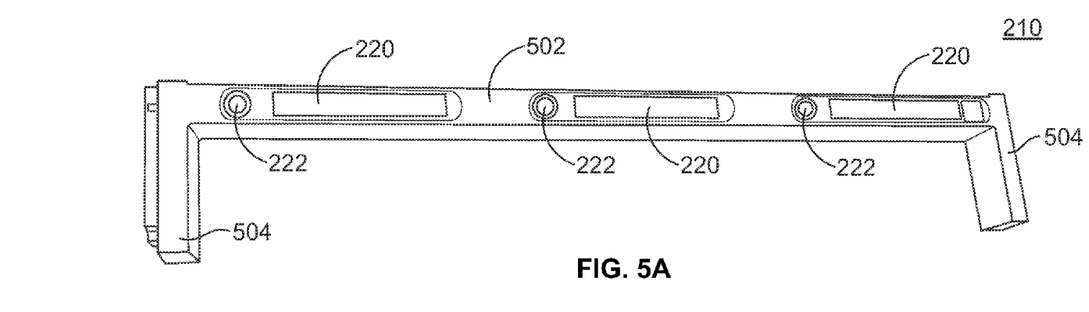
FIG. 5A is an isolated view of the front face or surface of a buttoned-in escutcheon.

The shape of the escutcheon 210 is also reminiscent of the shape of the symbol for pi, or π. Each escutcheon 210 has an elongated top portion 216 at the ends of which are two, downwardly-extending legs 208. FIG. 5A is a front perspective view of one escutcheon 210.

The left side 106 and the right side 108 of the cabinet 100 have elongated, upright covers 308 which enclose electrical connectors on the left and right ends of the escutcheons 210 and which "lock" the escutcheons 210 in place by virtue of the attachment of the covers 308 to the cabinet 100. The elongated covers 308 are formed with tabs 310 at the top end of the cover 308. The tab 310 is bent and extends through a mating slot 312 formed into a mounting flange that extends from the left and right sides but which is not visible in FIG. 2. A machine screw 314 at the bottom of the cover mates with a threaded hole in a second flange that extends from the chassis. Each cover 308 can thus be from the cabinet 100 and the escutcheons 210 removed by the removal of two machine screws 314. Stated another way, removing the escutcheons 210 requires only a screwdriver.

A heated compartment 116 is defined as the space between a substantially planar, electrically heated shelf 117 that also defines the bottom of a compartment 116 and, a substantially planar and optionally heated separation plate 119 that defines the top of a compartment. The holding cabinet 100 shown in FIG. 2 has five separate temperature-controlled compartments each of which is identified by the same reference numeral 116, however, an escutcheon 210 is applied to only the lower four temperature-controlled compartments 116. As stated above, the escutcheon 210 around the top compartment is shown in FIG. 2 as having been removed.

The top-most compartment 116, is shown with the escutcheon 210 removed in order to show a relatively thin, sheet metal flange 212 to which the escutcheons 210 are attached using interlocking keys and keyholes that are described below. A flange 212 visible in FIG. 2 is thus behind each escutcheon 210.

The flange 212 extends across the front 110 of the cabinet 100, i.e., between the left side 106 and right side 108 of the chassis. As shown in the figures, the flange 212 is formed with three, spaced-apart keyholes 214, however, alternate embodiments of the cabinet 100 have flanges 212 that have one keyhole, two keyholes, or four or more keyholes 214. The flange 212 thus provides a structure to which the escutcheon 210 is attached but it also provides a structure that encloses or seals the space between the shelves 117 that defines a heated surface on which food products or food product packing rests in a compartment 116 and a shelf separation plate 119 that defines the top of each compartment 116.

Figure 6:
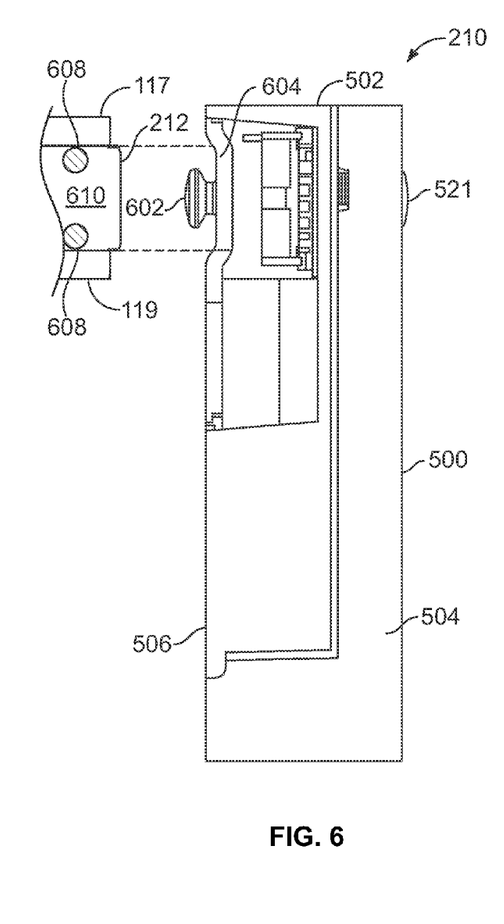
FIG. 6 is a left-hand side view of the escutcheon.

The left side of FIG. 6 shows the flange 212 in cross section and installed between a shelf 117 and a separation plate 199. The left side of FIG. 6 also shows electrically resistive wire heating elements 608 attached to the shelf 117 and separation plate 199 and located in the space 610 between the shelf 117 and separation plate 199.

Still referring to FIG. 6, the flange 212 is sized and arranged to provide a liquid-tight seal between the shelf 117 and plate 199 and thus enclose the space 610 between the shelf 117 and separation plate 119. Grease and other liquids are thus prevented from flowing into the space 610 between the shelf 117 and separation plate 119 where wire heating elements 608 that make thermal contact with the shelf 117 are located. An optional heating element 608 also makes thermal contact with the separation plate 199 to provide heat from the top of the compartment 116.

The flange 212 is sized, shaped and arranged to protrude outwardly from the front edges of the shelf 117 and separation plate 119. In an alternate embodiment, the flange 212 is flush with the shelf 117 and separation plate 119. In yet another embodiment, the flange 212 is recessed into the open space 610. In FIG. 6, the flange has a cross sectional shape that conforms to an indention 604 on the back side of the escutcheon. The slight curvature of both structures adds structural rigidly to both.

Figure 3:
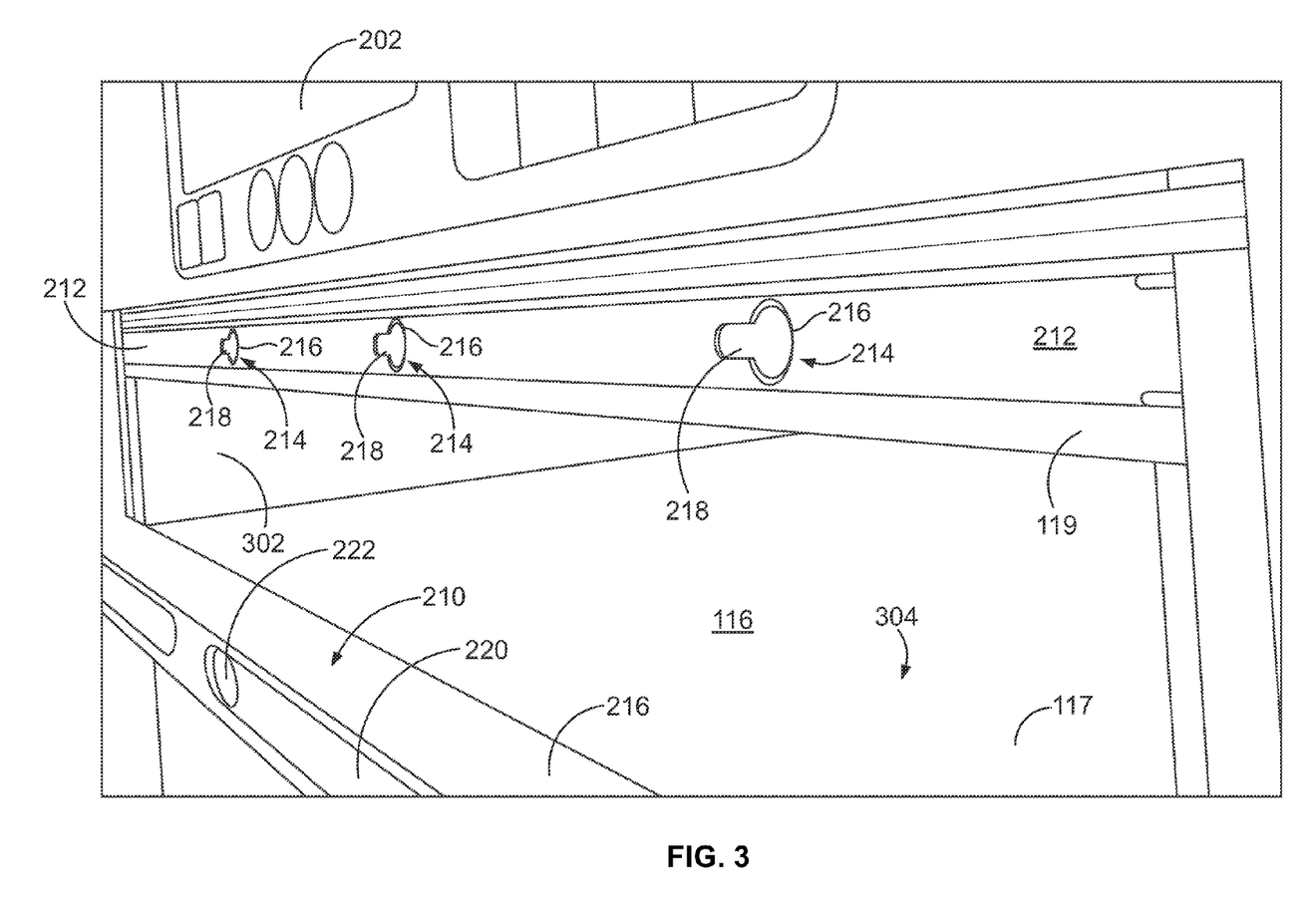
FIG. 3 is a first isolated perspective view of one compartment of the cabinet shown in FIG. 1.

Referring now to FIG. 2 and FIG. 3, the keyholes 214 in the flange 210 are considered herein to be comprised of two parts or sections. The first section of the keyhole 214 is a substantially circular hole 216 that extends completely through the flange 212. The second section of the keyhole 214 is an elongated slot portion 218 that is also formed completely through the material from which the flange 212 is made. The second "slot" portion 218 has a length that extends in a direction orthogonal to the sides 106 and 108 of the cabinet 100. The slot portion 218 "opens into" the first section 214. The second slot portion 218 (also referred to as a slot) is considered herein to extend laterally or sideways from the first circular portion 216.

The slot portion 218 has a length, which is considered herein to be the distance or length that the slot 218 extends laterally from the edge of the circular portion 216 to the terminal end of the slot 218, i.e., the end farthest from the first portion 214. The slot portion 218 also has a width, which is considered herein to be the dimension of the slot 218 orthogonal to the length. The keyholes 214 receive mating locking keys on the back or rear surface of each escutcheon 210. Insertion of the keys into the key holes and the translation of the keys in the slotted portion of the key holes is considered herein to be somewhat analogous or similar to the attachment of a button through a button hole. The escutcheon 210 is thus considered to be buttoned to the holding cabinet.

Best seen in FIG. 5A, but also visible in FIG. 2 is that the elongated top portion 502 of each escutcheon 210 has display panels 220 on which food information or heating/cooking information is displayed. A pushbutton or other input device 222 is located adjacent to each display panel 220 and provides a control input.

FIG. 3 is an isolated perspective view of the top-most compartment 116 of the cabinet 100 depicted in FIG. 1 and showing more clearly, the flange 212 and the keyholes 214 formed therein. It also shows the front edge of the separation plate 119 and the top surface of the shelf 117. FIG. 3 also shows the inside, left-hand side wall 302 of the top-most holding compartment 116 and the bottom 304 of the same compartment 116. Also shown in FIG. 3 is the elongated top portion 226 of the escutcheon 210 immediately below the top-most compartment 116 and which is attached to a flange not visible in the figure because the escutcheon 210 is attached to the flange by the inter-locking engagement of keys and keyholes described below. The keyholes 214 can be seen in FIG. 3 as having a circular first portion 216 and an elongated slot portion 218. Three keyholes 214 are formed into the flange 212.

Figure 4:
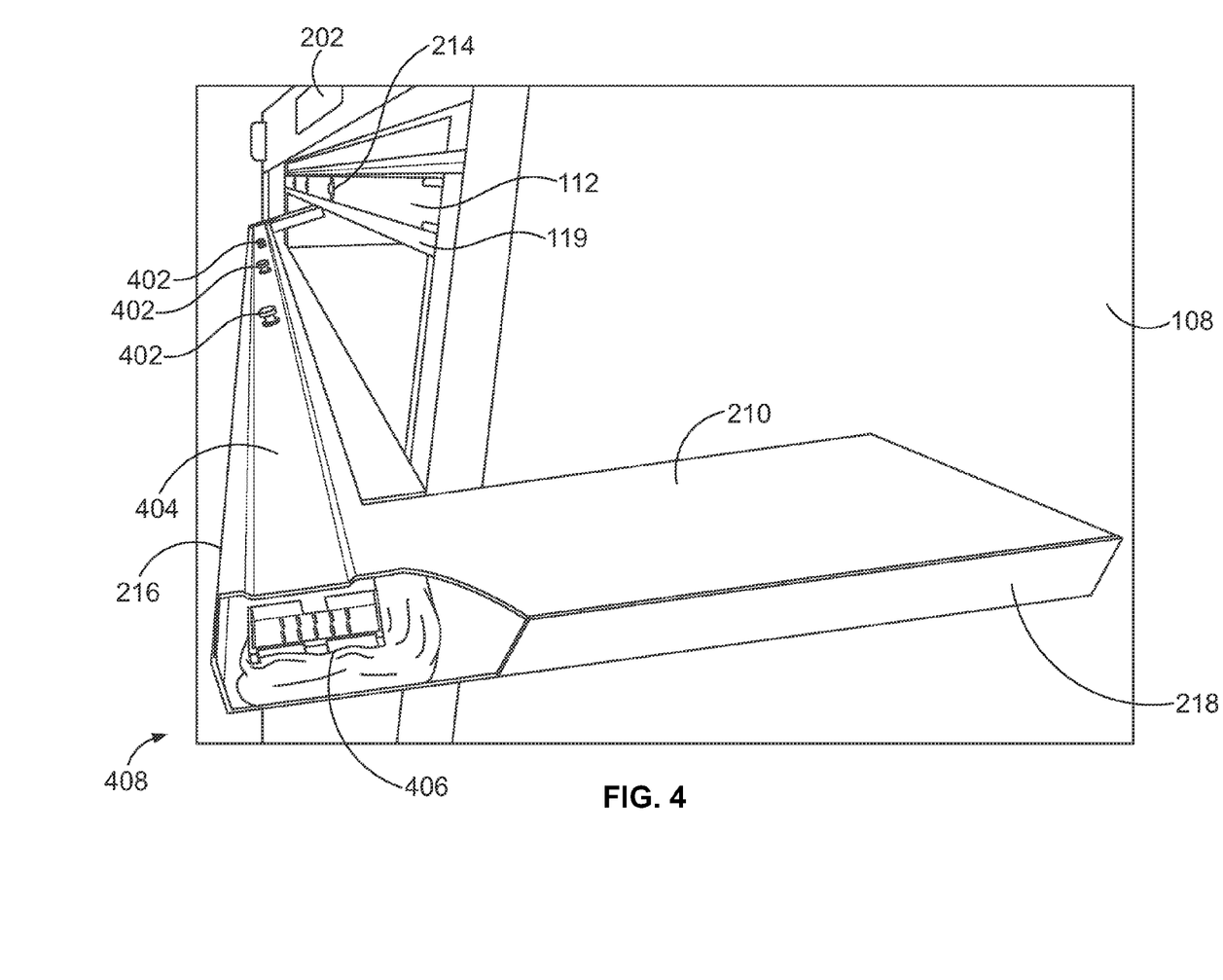
FIG. 4 is a second isolated view of one compartment of the cabinet depicted in FIG. 1.

FIG. 4 is another view of the top-most compartment 116 of the cabinet 100 depicted in FIG. 1 showing the back side 404 of escutcheon 210 for the same, top-most compartment 116. The escutcheon is shown removed and facing downwardly to expose the back or rear face 404 of the escutcheon 210. Three spaced-apart keys 402 extend away from the back face 404 of the elongated top portion 216 of the escutcheon. FIG. 4 also shows an electrical connector 406 facing outwardly from the back side 404 of the escutcheon. The connector 406 in FIG. 4 is located at the upper right-hand corner 408 of the escutcheon 210.

FIG. 5A is an isolated view of the front face or surface of the escutcheon 210. An elongated center portion 502 has downwardly-extending legs 504 at each end. Displays 220 and input controls 222 or switches are accessible to a user.

Figure 5B:
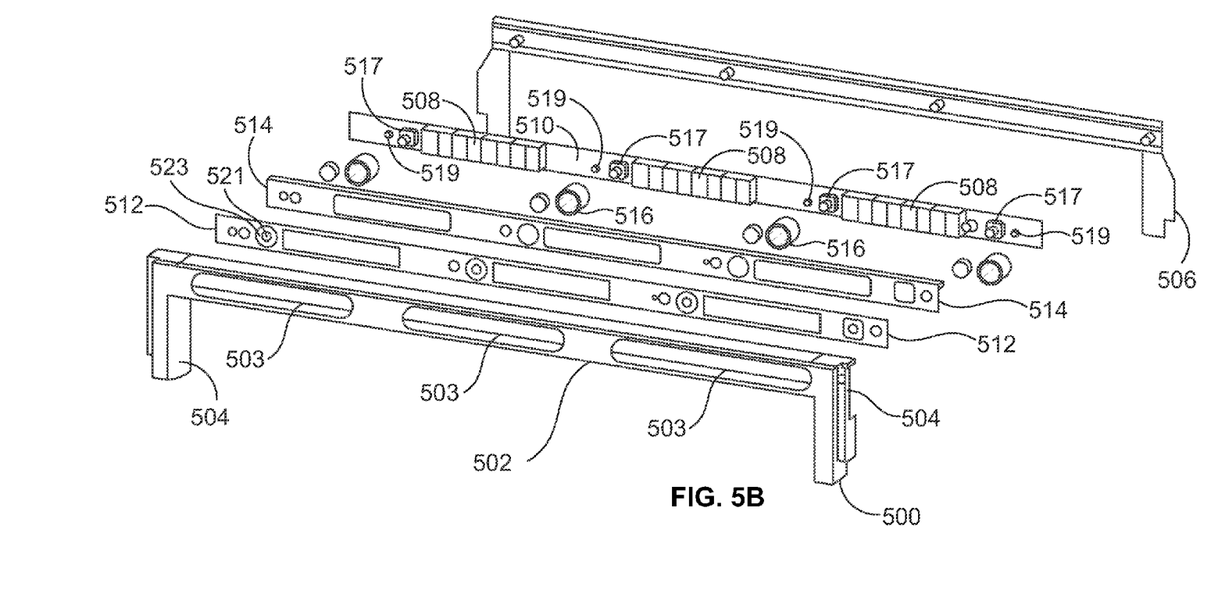
FIG. 5B is an exploded view of the escutcheon shown in FIG. 5A.

FIG. 5B is an exploded view of the escutcheon 210 shown in FIG. 5A. The escutcheon 210 is comprised of a front face 500 and a rear face 506. The front face 500 has the aforementioned elongated horizontal first portion 502 and the aforementioned downwardly extending legs 504 at opposite ends of the horizontal first portion 502. Elongated horizontal slots 503 are formed in the front face 500 and provide "windows" through which LEDs, liquid crystal display or plasma panels 508 mounted on a printed circuit board 510 can be seen. A plastic protective lens 512 is located in front of the circuit board 510 and held in place by a bezel 514. Short, hollow cylinders 516 made of an opaque plastic fit around pushbutton switches 517 mounted on the circuit board 510. Each cylinder 516 fits around one pushbutton switch 517 and around an array of light-emitting diodes 519 (one shown) mounted to the circuit board 510 such that the LEDs 519 are placed or located to "surround" the switches 517. The cylinders 516 have a height selected to keep the bezel 514, lens 512, and circuit board 510 aligned with each other but to also allow the pushbutton switch 517 that it surrounds to be actuated by being depressed through a flexible, light-transmissive filter 521 in the front face 500, i.e., flexible enough to facilitate actuation of the switch 517 that is located behind each filter 521. The opaque cylinders 516, LEDs 519 and transmissive filters 521 provide an illuminated indicator for a switch 517.

The transmissive filters 521 and cylinders 516 provide a lighted annulus 523 around the switch 517. The filters 521 and cylinders 516 are therefore sized, shaped and arranged to be light transmissive in such a way that a ring or annulus 523 of light is made to appear around the switch 517. Stated another way, the light-transmissive portion of a transmissive filter 521 is ring-shaped or annulus-shaped 523 and with an outside diameter relative to the inside diameter of the cylinder 516 such that an annular-shaped light 523 appears to be emitted around the switch 517. In alternate embodiments, the transmissive filters 521 have light-transmissive filters that are lighted dots or lighted arcs of a circle instead of ring-shaped or annular.

In one embodiment, four monochromatic LEDs are wired into the circuit board 510 and evenly distributed around a switch to provide a virtually continuous ring of light, i.e., a light that appears to be smooth and continuous and not from discrete points of light from separate LEDs. When used with monochromatic LEDs, a white filter 521 thus provides a monochromatic light around the filter 521 (annular) to identify where an operator should exert pressure on the filter 521 in order to actuate the switch 519 behind the filter 521.

In another embodiment, one or more monochromatic LEDs of a first color are wired into the circuit board 510, evenly distributed around a switch 519 and within a cylinder 516 made of an opaque plastic. One or more monochromatic LEDs of a second color are also wired into the circuit board 510, evenly distributed around the same switch 519 and within the same cylinder 516. By selectively activating LEDs of the first color and second color, a white filter 521 provides an indicator light around the filter 521 that can be two or three different colors by selectively activating the first and second colored LEDs or by activating both sets of LEDs at the same time.

In yet another embodiment, one or more red LEDs are wired into the circuit board 510, evenly distributed around a switch 519 and within a cylinder 516 made of an opaque plastic. One or more green LEDs are also wired into the circuit board 510, evenly distributed around the same switch 519 and within the same cylinder 516. One or more blue LEDs are also wired into the circuit board 510, evenly distributed around the same switch 519 and within the same cylinder 516. By selectively activating the red, green and blue LEDs, a white filter 521 provides an indicator light around the filter 521 that can display virtually any color, depending on how the colors are blended by the selective activation of red, green and blue LEDs and the selective control of the light level produced by each of them.

Mating tabs in the shape of bulbous protuberance formed in the rear portion 506 of the escutcheon 210 and mating slots that are formed in the front portion 500 hold the pieces of the escutcheon together. Not visible in FIG. 5 are the bulbous-shaped "keys" that extend away from the rear portion 506 of the escutcheon. The "keys" are sized, shaped and arranged to fit into the first, circular portion 216 of a keyhole 214. Once the key is fully inserted into the circular portion 216, sliding or translating the key and keyhole sideways with respect to each other locks the key and keyhole together.

FIG. 6 is a left-hand side view of the escutcheon 210 showing the escutcheon 210 after the layers depicted in FIG. 5 are assembled together and depicting how the escutcheon meets the flange 212. The front surface 500 is opposed by the rear surface 506. One of the aforementioned locking keys 602 extends orthogonally away from the rear surface 506. The face of a light-transmissive filter 521 behind which is a push-button switch 517 that is attached to the circuit board 510 inside the escutcheon 210.

As was stated above, the flange 212 is sized and arranged to provide a liquid-tight seal between a heated shelf 117 and separation plate 199. The flange 212 thus encloses the space 610 between the shelf 117 and separation plate 119. Grease and other liquids are thus prevented from flowing into the space 610 between the shelf 117 and separation plate 119 where wire heating elements 608 that make thermal contact with the shelf 117 are located. An optional heating element 608 also makes thermal contact with the separation plate 199 to provide heat from the top of the compartment 116.

In FIG. 6, the flange 212 is generally convex. It is sized, shaped and arranged to protrude outwardly from the front edges of the shelf 117 and separation plate 119 but it also conforms to a mating, concave-shaped curve 604 formed into the back side of the escutcheon. In an alternate embodiment, the flange 212 is flush with the shelf 117 and separation plate 119. In yet another embodiment, the flange 212 is recessed into the open space 610. In FIG. 6, the flange has a cross sectional shape that conforms to an indention 604 on the back side of the escutcheon. The slight curvature of both structures adds structural rigidly to both.

Figure 7:
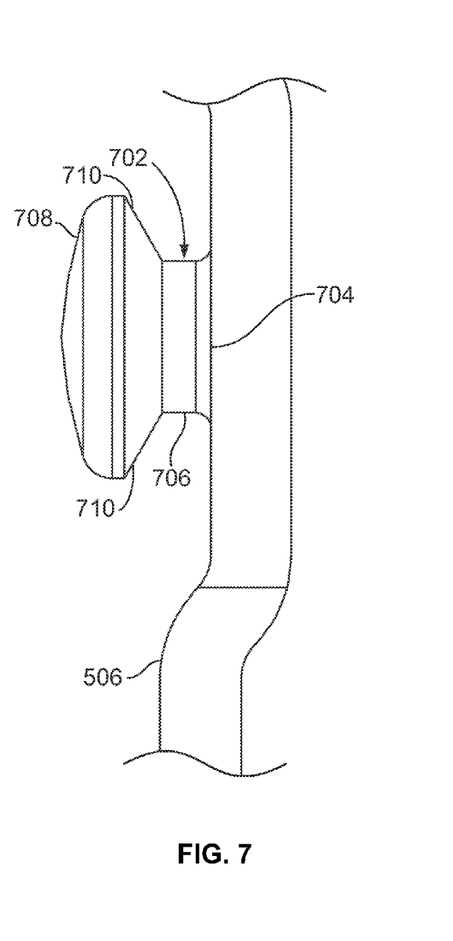
FIG. 7 is an isolated view of the escutcheon attachment key shown in FIG. 6.

FIG. 7 is an isolated view of the bulbous key 602 shown in FIG. 6 protruding from the back side or face 506 of the escutcheon 210. The key 602 is also referred to herein as a locking key. While the preferred embodiment of the key 602 is formed from the same material as the rear face 506, i.e., during an injection molding process, the key is nevertheless considered herein to be comprised of two portions.

A first portion 702 of the key 602 is substantially columnar, i.e., its shape is reminiscent of a column. The first, columnar portion 702 has a bottom or first end 704 that meets the rear surface 506 of the escutcheon 210. The first columnar portion 702 also has a second end 706 at which a bulbous second portion 708 is formed. The bulbous second part 708 has a tapered surface 710, the cross-sectional shape of which is reminiscent of a funnel.

In a preferred embodiment, the bulbous second portion 708 has an outside diameter. The diameter of the bulbous portion is selected to be less than the inside diameter of the substantially circular first portion 216 of the aforementioned keyholes 214. The bulbous second portion 708 will thus fit through the substantially circular first portion 216 of a keyhole 214 but not through the second slot portion 218 of a keyhole.

The columnar first portion 702 of the key 602 has an outside diameter selected to be less than the width of the second slot portion 218 of a keyhole. When the bulbous second portion 708 of the key 602 is fully inserted into the substantially circular portion 216 of a keyhole 214, the entire key can and the escutcheon 210 to which it is attached can translate sideways, with the columnar portion 702 sliding in the slot portion 218 of the keyhole. Translating the key 602 sideways in a keyhole 214 to where the bulbous second portion 708 is "behind" the slot portion 218 will thus button or lock the key 602 into the keyhole 214. The taper 710 on the bulbous second portion 708 is sized, shaped and arranged to provide a compressive force against the flange as the key 602 is slid laterally through the rectangular slot portion of the keyhole. Sideways translation of the key 602 in the keyhole removably attaches the escutcheon 210 to the flange when the escutcheon is slid in a first direction. Sliding the escutcheon sideways in the opposite direction allows the escutcheon to be removed from the flange. The assembly is pushed "in" or toward the cabinet 100 when sliding either to the left to insert or to the right to remove.

Figure 8:
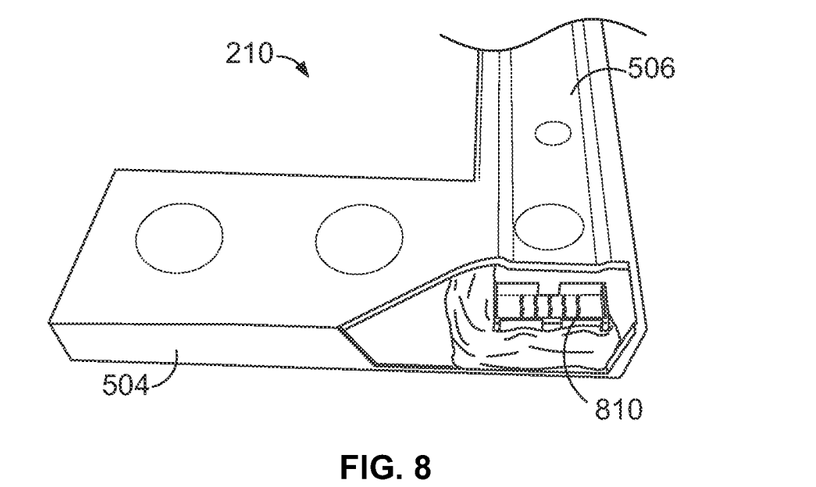
FIG. 8 is an isolated view of the back side of the left-hand end of the escutcheon.
Figure 9:
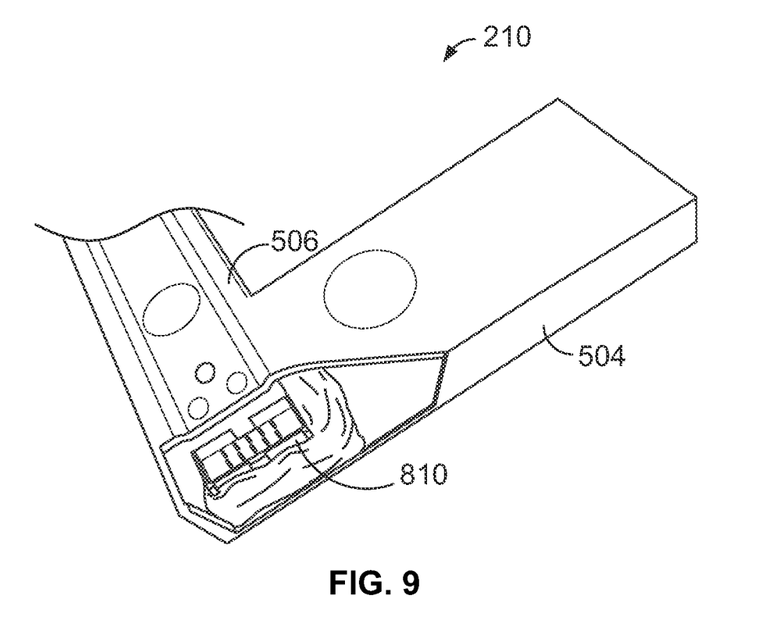
FIG. 9 is an isolated view of the back side of the right-hand end of the escutcheon.

For completeness, FIG. 8 is an isolated view of the back side 506 of the left-hand end of the escutcheon 210. FIG. 9 is an isolated view of the back side 506 of the right-hand end of the escutcheon 210. As shown in FIG. 8 and FIG. 9, both ends of the back side 506 of the escutcheon 210 are provided with electrical connectors 810. The electrical connectors 810 provide an electrical interface between circuitry and displays of the escutcheon 210 that are shown in FIG. 5, and electronics within the cabinet 100.

Figure 10:
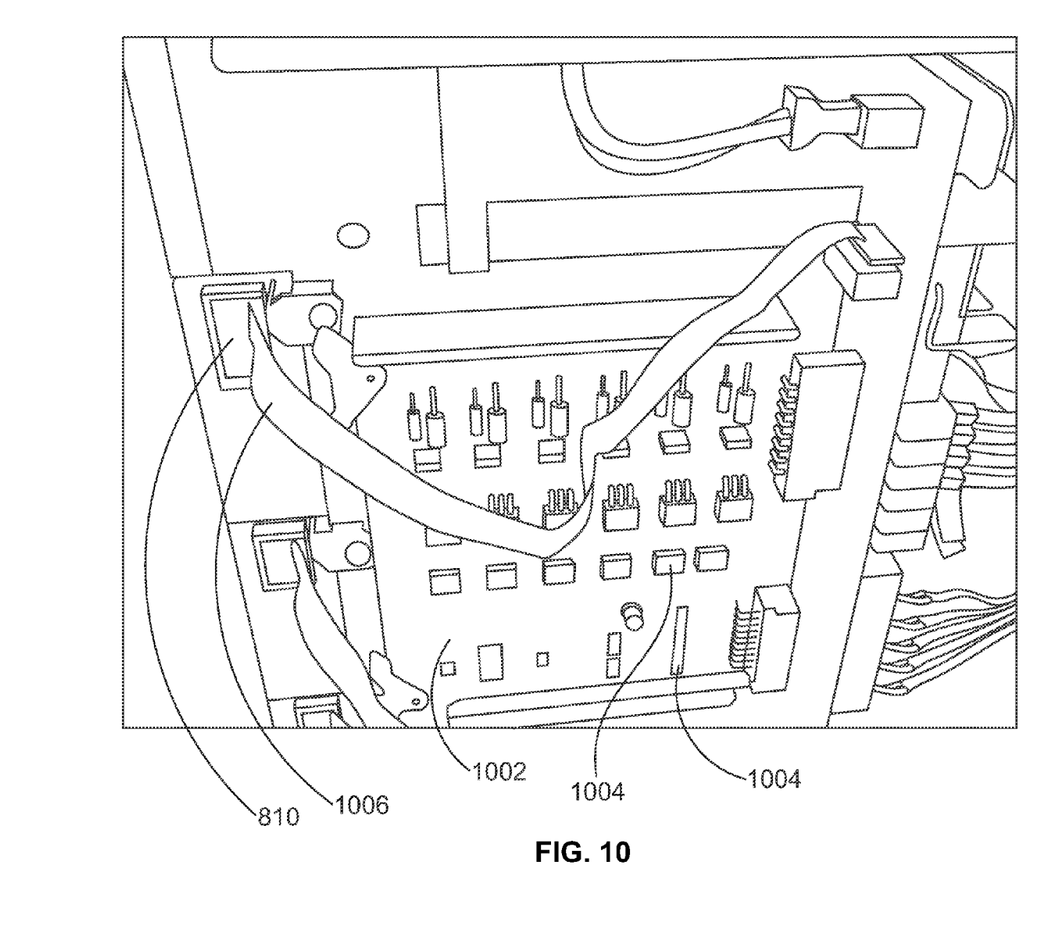
FIG. 10 is an isolated view of the cabinet with the right side removed to show electronic circuit boards having electronic components.

FIG. 10 is an isolated view of the cabinet 100 with the right side 108 removed to show electronic circuit boards 1002 having electronic components 1004 that control the cabinet 100. The electrical connector 810 of the top-most escutcheon 210 is electrically connected via a ribbon cable 1006 to components 1004 mounted on a circuit board 1002.

Those of ordinary skill in the art will recognize that the embodiments described above have the keyhole 214 formed as part of the flange 212. Insertion of the bulbous portion of the key into the circular portion of a key hole followed by the lateral translation of the key in the key hole, made possible by sliding the columnar portion of the key sideways through the slot portion of a key hole, attaches the escutcheon to the flange. The action of attaching the escutcheon to the flange is analogous to the insertion of a button into a button hole. The escutcheon is thus considered to be "buttoned in" to the holding cabinet.

In a preferred embodiment, the keys 402, which interlock with the keyholes 214 are formed as part of the escutcheon. In an alternate embodiment, the "location" of the keys and keyholes are reversed. The flange 212 is provided with keys that interlock with keyholes formed into the back sides of the escutcheons.

The escutcheon need not be U-shaped. In an alternate embodiment, the escutcheon does not have downwardly-extending legs at each end of the center portion 502.

It will be apparent to those of ordinary skill that the escutcheon 212, the key 402 and the keyhole 214 provide a food holding cabinet having escutcheons 210 that are field-removable, the removal of which requires little or no tools.

The foregoing description is for purposes of illustration only as the true scope of the invention is set forth by the appurtenant claims.

What is claimed is:

1. An escutcheon for a food holding cabinet, the escutcheon comprised of:
   a center portion having front and rear surfaces and first and second opposing ends;
   a key extending outwardly from the rear surface, the key being configured to fit into a mating key hole and thereby attach the escutcheon to the food holding cabinet; and
   at least one of a user input device or a display housed within the center portion of the escutcheon and exposed through an opening in the front surface of the center portion of the escutcheon.

2. The escutcheon of claim 1, wherein at least one of the first and second opposing ends is provided with a leg, which is substantially orthogonal to the center portion.

3. The escutcheon of claim 1, wherein the key is comprised of first and second parts, the first part of the key being columnar with top and bottom ends, the first part of the key having a first outside diameter extending away from the rear surface of the escutcheon, the bottom end of the first part of the key being coupled to and beginning at the rear surface of the escutcheon, the second part of the key being bulbous and attached to the top end of the first part of the key, the second part of the key having a second outside diameter greater than the first outside diameter of the first part of the key.

4. The escutcheon of claim 2, wherein the key is configured to fit into a key hole comprised of a substantially circular first part and a substantially rectangular second part, which is joined with the substantially circular first part, the substantially circular first part of the key hole having a diameter selected to accept the bulbous second part of the key, the substantially rectangular second part of the key hole having a length and a width, the width being selected to deny entry of the bulbous second part of the key into the rectangular second part and accept the outside diameter of the first part of the key.

5. The escutcheon of claim 4, wherein the key hole is formed in a flange attached to a food warming cabinet and wherein the key and key hole are configured to urge the escutcheon and the flange together as the first part of the key is moved away from the substantially circular part of the key hole, along the rectangular second part of the key hole.

6. The escutcheon of claim 1, wherein the user input device is comprised of a user interface.

7. The escutcheon of claim 6, wherein the user interface is comprised of at least one switch.

8. The escutcheon of claim 6, wherein the user interface is comprised of an illuminated switch.

9. The escutcheon of claim 8, wherein the illuminated switch is comprised of an annulus around the switch, the annulus being around a plurality of light emitting diodes.

10. The escutcheon of claim 6, wherein the user interface is comprised of a switch, at least partially illuminated by a multi-colored, annular-shaped light source, which provides an illuminated annulus around the switch.

11. The escutcheon of claim 10, wherein the multi-colored annular-shaped light source is comprised of a plurality of light emitting diodes.

12. The escutcheon of claim 10, wherein the multi-colored light source is comprised of a substantially opaque cylinder having first and second ends and a light filter, the cylinder surrounding the plurality of light emitting diodes at the first end, the light filter being proximate the second end;
   whereby light from the light emitting diodes is emitted from the light filter.

13. The escutcheon of claim 1, comprising an electrical connector housed within the escutcheon and exposed through an opening in the rear surface of the center portion of the escutcheon, the electrical connector being configured to provide an electrical interface between circuitry in the food holding cabinet and the user input device or display.

14. A temperature-controlled food holding cabinet having at least one food holding compartment, the food holding cabinet comprised of:
   a chassis having a flange adjacent to an opening into a temperature-controlled food holding compartment, the flange facing away from the cabinet and having a key hole formed therein; and
   an escutcheon having:
      a front surface;
      a rear surface abutting the flange of the chassis;
      a key extending outwardly from the rear surface, the key being inserted into the key hole, the key and key hole being configured to allow the escutcheon to be translated in a first direction to attach the escutcheon to the flange and translated in an opposite second direction to release the escutcheon from the flange; and
      at least one of a user input device or a display housed within the escutcheon and exposed through an opening in the front surface of the escutcheon.

15. The temperature-controlled food holding cabinet of claim 14, wherein the user input device comprises an electrical user interface, which is electrically connected to circuitry within the chassis through a connector attached to the escutcheon.

16. The temperature-controlled food holding cabinet of claim 14, wherein the hole is comprised of a substantially circular part and an elongated slot part extending laterally away from the substantially circular part, the substantially circular part of the hole having a first diameter, the elongated slot part of the hole having a length and a width, the length dimension being in a direction away from the substantially circular part of the hole, the first diameter of the substantially circular part of the hole being selected to receive a bulbous first part of the key, the bulbous first part of the key having a second diameter less than the first diameter, the width of the elongated slot part of the hole being less than the first diameter and less than the second diameter.

17. The temperature-controlled food holding cabinet of claim 14, the key including a first part and a second part, the first part of the key being columnar and having a first outside diameter, the first part of the key having a top end and a bottom end, the bottom end being attached to and beginning at the rear surface of the escutcheon, the first part of the key extending away from the rear surface of the escutcheon such that the top end of the first part of the key is spaced apart from the rear surface of the escutcheon, the second part of the key being bulbous and attached to the top end of the first part of the key, the second part of the key having a second outside diameter greater than the first outside diameter of the first part of the key.

18. The temperature-controlled food holding cabinet of claim 14, comprising an electrical connector housed within the escutcheon and exposed through an opening in the rear surface of the escutcheon, the electrical connector being configured to provide an electrical interface between circuitry in the chassis and the user input device or display.

\* \* \* \* \*